(12) United States Patent
Lee et al.

(10) Patent No.: US 6,605,267 B1
(45) Date of Patent: Aug. 12, 2003

(54) ZEOLITE SSZ-50

(75) Inventors: Gregory S. Lee, San Ramon, CA (US); Stacey I. Zones, San Francisco, CA (US)

(73) Assignee: Chevron U.S.A. Inc., San Francisco, CA (US)

( * ) Notice: Subject to any disclaimer, the term of this patent is extended or adjusted under 35 U.S.C. 154(b) by 41 days.

(21) Appl. No.: 09/712,083

(22) Filed: Nov. 13, 2000

Related U.S. Application Data

(63) Continuation-in-part of application No. 09/465,237, filed on Dec. 15, 1999, now abandoned.

(51) Int. Cl.$^7$ ................................................ C01B 39/48
(52) U.S. Cl. ........................ 423/706; 423/718; 423/713
(58) Field of Search ................................ 423/706, 713, 423/718

(56) References Cited

U.S. PATENT DOCUMENTS

| | | | |
|---|---|---|---|
| 4,859,442 A | * 8/1989 | Zones et al. | 423/277 |
| 5,268,161 A | * 12/1993 | Nakagawa | 423/702 |
| 5,614,166 A | * 3/1997 | Gies et al. | 423/718 |
| 5,939,044 A | * 8/1999 | Nakagawa et al. | 423/706 |

OTHER PUBLICATIONS

Vortmann et al., "The Crystal Structure of the new Boron Containing Zeolite RUB–13," Zeolite Science 1994: Recent Progress and Discussions, Studies in Surface Science and Catalysis, vol. 98, pp. 262–263, 1995.*
Vortmann et al., "Synthesis and Crystal Structure of the new Borosilicate Zeolite RUB–13," Microporous Materials, vol. 4, 1995, pp. 111–121.*

* cited by examiner

*Primary Examiner*—David Sample
(74) *Attorney, Agent, or Firm*—Richard J. Sheridan

(57) ABSTRACT

The present invention relates to new crystalline zeolite SSZ-50 prepared using a quaternary ammonium cation templating agent having the structure

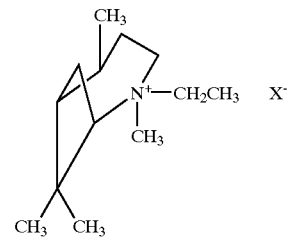

where X- is an anion which is not detrimental to the formation of the SSZ-50. SSZ-50 is useful in catalysts for hydrocarbon conversion reactions.

12 Claims, No Drawings

ZEOLITE SSZ-50

This application is a continuation-in-part of Ser. No. 09/465,237, filed Dec. 15, 1999 now abandoned.

BACKGROUND OF THE INVENTION

1. Field of the Invention

The present invention relates to crystalline zeolite SSZ-50, which has the RTH structure in accord with the Atlas for Zeolite Structure Types. The present invention also relates to a method for preparing crystalline zeolites having the RTH structure, including SSZ-50, using the quaternary ammonium cation templating agent N-ethyl-N-methyl-5,7,7-trimethyl-2-azonium bicyclo[4.1.1]octane, and processes employing SSZ-50 as a catalyst.

2. State of the Art

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications. New zeolites may contain novel internal pore architectures, providing enhanced selectivities in these processes.

SUMMARY OF THE INVENTION

In accordance with this invention, there is provided a zeolite having a mole ratio of about 20 or greater of an oxide selected from silicon oxide, germanium oxide and mixtures thereof to an oxide selected from aluminum oxide, gallium oxide, iron oxide, titanium oxide, indium oxide, vanadium oxide and mixtures thereof and having, after calcination, the X-ray diffraction lines of Table I below. Use of therm 20 or greater means that the zeolite can be an all-silicon oxide (or germanium oxide) material.

The present invention further provides such a zeolite having a composition, as synthesized and in the anhydrous state, in terms of mole ratios as follows:

$YO_2/W_cO_d$ 20 or greater
$M_{2/n}/YO_2$ 0.03–0.20
$Q/YO_2$ 0.02–0.08 wherein Y is silicon, germanium or a mixture thereof; W is aluminum, gallium, iron, titanium, indium, vanadium or mixtures thereof; c is 1 or 2; d is 2 when c is 1 (i.e., W is tetravalent) or d is 3 or 5 when c is 2 (i.e., d is 3 when W is trivalent or 5 when W is pentavalent); M is an alkali metal cation, alkaline earth metal cation or mixtures thereof; n is the valence of M (i.e., 1 or 2); and Q is a quaternary ammonium cation having the structure

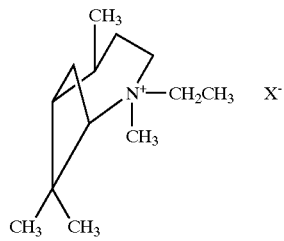

The zeolite has, after calcination, the X-ray diffraction lines of Table I below.

In accordance with this invention, there is also provided a zeolite prepared by thermally treating a zeolite having a mole ratio of an oxide selected from silicon oxide, germanium oxide and mixtures thereof to an oxide selected from aluminum oxide, gallium oxide, iron oxide, titanium oxide, indium oxide, vanadium oxide and mixtures thereof of about 20 or greater at a temperature of from about 200° C. to about 800° C., the thus-prepared zeolite having the X-ray diffraction lines of Table I. The present invention also includes this thus-prepared zeolite which is predominantly in the hydrogen form, which hydrogen form is prepared by ion exchanging with an acid or with a solution of an ammonium salt followed by a second calcination.

Also provided in accordance with the present invention is a method of preparing a crystalline material having the RTH crystal structure and having a mole ratio of about 20 or greater of an oxide selected from silicon oxide, germanium oxide and mixtures thereof to an oxide selected from aluminum oxide, gallium oxide, iron oxide, titanium oxide, indium oxide, vanadium oxide and mixtures thereof, said method comprising contacting under crystallization conditions sources of said oxides and a templating agent comprising Template A.

The present invention additionally provides a process for converting hydrocarbons comprising contacting a hydrocarbonaceous feed at hydrocarbon converting conditions with a catalyst comprising the zeolite of this invention. The zeolite may be predominantly in the hydrogen form. It may also be substantially free of acidity.

Further provided by the present invention is a hydrocracking process comprising contacting a hydrocarbon feedstock under hydrocracking conditions with a catalyst comprising the zeolite of this invention, preferably predominantly in the hydrogen form.

This invention also includes a dewaxing process comprising contacting a hydrocarbon feedstock under dewaxing conditions with a catalyst comprising the zeolite of this invention, preferably predominantly in the hydrogen form.

The present invention also includes a process for improving the viscosity index of a dewaxed product of waxy hydrocarbon feeds comprising contacting the waxy hydrocarbon feed under isomerization dewaxing conditions with a catalyst comprising the zeolite of this invention, preferably predominantly in the hydrogen form.

The present invention further includes a process for producing a $C_{20+}$ lube oil from a $C_{20+}$ olefin feed comprising isomerizing said olefin feed under isomerization conditions over a catalyst comprising at least one Group VIII metal and the zeolite of this invention. The zeolite may be predominantly in the hydrogen form.

In accordance with this invention, there is also provided a process for catalytically dewaxing a hydrocarbon oil feedstock boiling above about 350° F. and containing straight chain and slightly branched chain hydrocarbons comprising contacting said hydrocarbon oil feedstock in the presence of added hydrogen gas at a hydrogen pressure of about 15–3000 psi with a catalyst comprising at least one Group VIII metal and the zeolite of this invention, preferably predominantly in the hydrogen form. The catalyst may be a layered catalyst comprising a first layer comprising at least one Group VIII metal and the zeolite of this invention, and a second layer comprising an aluminosilicate zeolite which has different shape selectivity than the zeolite of said first layer.

Also included in the present invention is a process for preparing a lubricating oil which comprises hydrocracking in a hydrocracking zone a hydrocarbonaceous feedstock to obtain an effluent comprising a hydrocracked oil, and catalytically dewaxing said effluent comprising hydrocracked oil at a temperature of at least about 400° F. and at a pressure of from about 15 psig to about 3000 psig in the presence of added hydrogen gas with a catalyst comprising at least one Group VIII metal and the zeolite of this invention. The zeolite may be predominantly in the hydrogen form.

Further included in this invention is a process for isomerization dewaxing a raffinate comprising contacting said raffinate in the presence of added hydrogen with a catalyst comprising at least one Group VIII metal and the zeolite of this invention. The raffinate may be bright stock, and the zeolite may be predominantly in the hydrogen form.

Also provided by the present invention is a catalytic cracking process comprising contacting a hydrocarbon feedstock in a reaction zone under catalytic cracking conditions in the absence of added hydrogen with a catalyst comprising the zeolite of this invention, preferably predominantly in the hydrogen form. Also included in this invention is such a catalytic cracking process wherein the catalyst additionally comprises a large pore crystalline cracking component.

The present invention further provides a process for oligomerizing olefins comprising contacting an olefin feed under oligomerization conditions with a catalyst comprising the zeolite of this invention.

There is further provided in accordance with this invention a process for isomerizing olefins comprising contacting an olefin feed under isomerization conditions with a catalyst comprising the zeolite of this invention.

Further provided in accordance with this invention is a process for the production of higher molecular weight hydrocarbons from lower molecular weight hydrocarbons comprising the steps of:

(a) introducing into a reaction zone a lower molecular weight hydrocarbon-containing gas and contacting said gas in said zone under $C_{2+}$ hydrocarbon synthesis conditions with a catalyst comprising the zeolite of this invention and a metal or metal compound capable of converting the lower molecular weight hydrocarbon to a higher molecular weight hydrocarbon; and (b) withdrawing from said reaction zone a higher molecular weight hydrocarbon-containing stream. Preferably, the metal or metal compound is a lanthanide or actinide metal or metal compound and the lower molecular weight hydrocarbon is methane.

This invention also provides a process for converting lower alcohols and other oxygenated hydrocarbons comprising contacting said lower alcohol or other oxygenated hydrocarbon with a catalyst comprising the zeolite of this invention under conditions to produce liquid products.

Also provided by the present invention is an improved process for the reduction of oxides of nitrogen contained in a gas stream in the presence of oxygen wherein said process comprises contacting the gas stream with a zeolite, the improvement comprising using as the zeolite the zeolite of this invention. The zeolite may contain a metal or metal ions (such as cobalt, copper or mixtures thereof) capable of catalyzing the reduction of the oxides of nitrogen, and may be conducted in the presence of a stoichiometric excess of oxygen. In a preferred embodiment, the gas stream is the exhaust stream of an internal combustion engine.

Also provided in accordance with this invention is a process for the separation of nitrogen from a nitrogen-containing gas mixture comprising contacting the mixture with a composition comprising the zeolite of this invention. In a preferred embodiment, the gas mixture contains nitrogen and methane.

DETAILED DESCRIPTION OF THE INVENTION

SSZ-50 is a crystalline material having the RTH crystal structure and having aluminum atoms in its crystal framework. It is believed SSZ-50 is the first such crystalline material. Other materials having the RTH crystal structure, such as the material designated RUB-13, are known, but they do not have metal atoms in their crystal structure. Typically, they are prepared as silicoborates. In many cases the boron in silicoborates can be replaced with aluminum by post-synthesis treatment. However, this has not been the case with RUB-13 (see the Comparative Examples below).

SSZ-50 is prepared from a reaction mixture having the composition shown in Table A below.

TABLE A

| Reaction Mixture | |
|---|---|
| $YO_2/W_aO_b$ | 15–300 |
| $OH^-/YO_2$ | 0.20–1.0 |
| $Q/YO_2$ | 0.10–0.40 |
| $M_{2/n}/YO_2$ | 0.05–0.40 |
| $H_2O/YO_2$ | 15–50 | where Y, W, Q, M and n are as defined above, and a is 1 or 2, and b is 2 when a is 1 (i.e., W is tetravalent) and b is 3 when a is 2 (i.e., W is trivalent).

In practice, SSZ-50 is prepared by a process comprising:

(a) preparing an aqueous solution containing sources of at least one oxide capable of forming a crystalline molecular sieve and Template A;

(b) maintaining the aqueous solution under conditions sufficient to form crystals of SSZ-50; and (c) recovering the crystals of SSZ-50.

Typical sources of aluminum oxide for the reaction mixture include aluminates, alumina, aluminum colloids, aluminum oxide coated on silica sol, hydrated alumina gels such as $Al(OH)_3$ and aluminum compounds such as $AlCl_3$ and $Al_2(SO_4)_3$. Typical sources of silicon oxide include silicates, silica hydrogel, silicic acid, fumed silica, colloidal silica, tetra-alkyl orthosilicates, and silica hydroxides. Gallium, germanium, titanium, indium, vanadium and iron can be added in forms corresponding to their aluminum and silicon counterparts.

A source zeolite reagent may provide a source of aluminum. In most cases, the source zeolite also provides a source of silica. The source zeolite in its dealuminated form may also be used as a source of silica, with additional silicon added using, for example, the conventional sources listed above. Use of a source zeolite reagent as a source of alumina for the present process is more completely described in U.S. Pat. No. 4,503,024 issued on Mar. 5, 1985 to Bourgogne et al. entitled "PROCESS FOR THE PREPARATION OF SYNTHETIC ZEOLITES, AND ZEOLITES OBTAINED BY SAID PROCESS", the disclosure of which is incorporated herein by reference.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The templating agent may be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

The organic templating agent used to prepare SSZ-50 is an N-ethyl-N-methyl-5,7,7-trimethyl-2-azonium bicyclo [4.1.1]octane cation having the following structure:

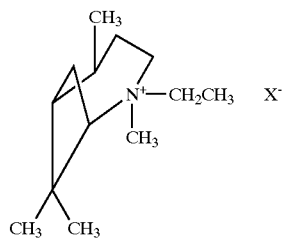

where X is an anion that is not detrimental to the formation of the SSZ-50. Representative anions include halogen, e.g., fluoride, chloride, bromide and iodide, hydroxide, acetate, sulfate, tetrafluoroborate, carboxylate, and the like. Hydroxide is the most preferred anion.

The reaction mixture is maintained at an elevated temperature until the crystals of the SSZ-50 zeolite are formed. The hydrothermal crystallization is usually conducted under autogenous pressure, at a temperature between 120° C. and 160° C. The crystallization period is typically greater than I day and preferably from about 3 days to about 20 days.

Preferably, the zeolite is prepared using mild stirring or agitation.

During the hydrothermal crystallization step, the SSZ-50 crystals can be allowed to nucleate spontaneously from the reaction mixture. The use of SSZ-50 crystals as seed material can be advantageous in decreasing the time necessary for complete crystallization to occur. In addition, seeding can lead to an increased purity of the product obtained by promoting the nucleation and/or formation of SSZ-50 over any undesired phases. When used as seeds, SSZ-50 crystals are added in an amount between 0.1 and 10% of the weight of silica used in the reaction mixture.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-50 zeolite crystals. The drying step can be performed at atmospheric pressure or under vacuum.

SSZ-50 as prepared has a mole ratio of an oxide selected from silicon oxide, germanium oxide and mixtures thereof to an oxide selected from aluminum oxide, gallium oxide, iron oxide, titanium oxide, indium oxide, vanadium oxide and mixtures thereof of about 20 or greater; and has, after calcination, the X-ray diffraction lines of Table I below. SSZ-50 further has a composition, as synthesized and in the anhydrous state, in terms of mole ratios, shown in Table B below.

TABLE B

| As-Synthesized SSZ-50 | |
|---|---|
| $YO_2/W_cO_d$ | 20 or greater |
| $M_{2/n}/YO_2$ | 0.03–0.20 |
| $Q/YO_2$ | 0.02–0.08 | where Y, W, c, d, Q, M and n are as defined above.

Lower silica to alumina ratios may be obtained by using methods which insert aluminum into the crystalline framework. For example, aluminum insertion may occur by thermal treatment of the zeolite in combination with an alumina binder or dissolved source of alumina. Such procedures are described in U.S. Pat. No. 4,559,315, issued on Dec. 17, 1985 to Chang et al.

After calcination, the SSZ-50 zeolites have a crystalline structure whose X-ray powder diffraction pattern include the characteristic lines shown in Table I:

TABLE I

| Calcined SSZ-50 | | |
|---|---|---|
| 2 Theta[a] | D | Relative Intensity |
| 8.45 | 10.5 | M–VS |
| 8.95 | 9.87 | S–VS |
| 10.0 | 8.84 | W–VS |
| 17.6 | 5.04 | W–S |
| 18.55 | 4.78 | W–S |
| 22.95 | 3.87 | W–M |
| 24.9 | 3.57 | W–VS |
| 30.45 | 2.93 | W–M |
| 32.35 | 2.76 | W |
| 37.0 | 2.43 | W |

[a] ±0.20
[b] The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

Table IA below shows the X-ray powder diffraction lines for calcined SSZ-50 including actual relative intensities.

TABLE IA

| Calcined SSZ-50 | | |
|---|---|---|
| 2 Theta[a] | D | Relative Intensity ($I/I_o \times 100$) |
| 8.45 | 10.5 | 35–100 |
| 8.95 | 9.87 | 40–100 |
| 10.0 | 8.84 | 10–80 |
| 17.6 | 5.04 | 10–60 |
| 18.55 | 4.78 | 5–60 |
| 22.95 | 3.87 | 5–25 |
| 24.9 | 3.57 | 5–75 |
| 30.45 | 2.93 | 5–25 |
| 32.35 | 2.76 | 5–15 |
| 37.0 | 2.43 | 1–10 |

[a] ±0.20

The X-ray powder diffraction patterns were determined by standard techniques. The radiation was the K-alpha/doublet of copper. The peak heights and the positions, as a function of 2θ where θ is the Bragg angle, were read from the relative intensities of the peaks, and d, the interplanar spacing in Angstroms corresponding to the recorded lines, can be calculated.

Representative peaks from the X-ray diffraction pattern of calcined SSZ-50 are shown in Table I. Calcination can result in changes in the intensities of the peaks as compared to patterns of the "as-made" material, as well as minor shifts in the diffraction pattern. The zeolite produced by exchanging the metal or other cations present in the zeolite with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

Crystalline SSZ-50 can be used as-synthesized, but preferably will be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica to alumina mole ratio. The zeolite can also be steamed; steaming helps stabilize the crystalline lattice to attack from acids.

The zeolite can be used in intimate combination with hydrogenating components, such as tungsten, vanadium molybdenum, rhenium, nickel cobalt, chromium, manganese, or a noble metal, such as palladium or platinum, for those applications in which a hydrogenation-dehydrogenation function is desired.

Metals may also be introduced into the zeolite by replacing some of the cations in the zeolite with metal cations via standard ion exchange techniques (see, for example, U.S. Pat. No. 3,140,249 issued Jul. 7, 1964 to Plank et al.; U.S. Pat. No. 3,140,251 issued Jul. 7, 1964 to Plank et al.; and U.S. Pat. No. 3,140,253 issued Jul. 7, 1964 to Plank et al.). Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be ion-exchanged into the SSZ-50. The zeolite can also be impregnated with the metals, or, the metals can be physically and intimately admixed with the zeolite using standard methods known to the art.

Typical ion-exchange techniques involve contacting the synthetic zeolite with a solution containing a salt of the desired replacing cation or cations. Although a wide variety of salts can be employed, chlorides and other halides, acetates, nitrates, and sulfates are particularly preferred. The zeolite is usually calcined prior to the ion-exchange procedure to remove the organic matter present in the channels and on the surface, since this results in a more effective ion exchange. Representative ion exchange techniques are disclosed in a wide variety of patents including U.S. Pat. Nos. 3,140,249 issued on Jul. 7, 1964 to Plank et al.; U.S. Pat. No. 3,140,251 issued on Jul. 7, 1964 to Plank et al.; and U.S. Pat. No. 3,140,253 issued on Jul. 7, 1964 to Plank et al.

Following contact with the salt solution of the desired replacing cation, the zeolite is typically washed with water and dried at temperatures ranging from 65° C. to about 200° C. After washing, the zeolite can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of SSZ-50, the spatial arrangement of the atoms which form the basic crystal lattice of the zeolite remains essentially unchanged.

SSZ-50 can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

SSZ-50 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

Hydrocarbon Conversion Processes

SSZ-50 zeolites are useful in hydrocarbon conversion reactions. Hydrocarbon conversion reactions are chemical and catalytic processes in which carbon containing compounds are changed to different carbon containing compounds. Examples of hydrocarbon conversion reactions in which SSZ-50 are expected to be useful include hydrocracking, dewaxing, catalytic cracking and olefin formation reactions. The catalysts are also expected to be useful in other petroleum refining and hydrocarbon conversion reactions such as isomerizing n-paraffins and naphthenes, isomerizing olefins, polymerizing and oligomerizing olefinic or acetylenic compounds such as isobutylene and butene-1, reforming, forming higher molecular weight hydrocarbons from lower molecular weight hydrocarbons (e.g., methane upgrading) and oxidation reactions. The SSZ-50 catalysts may have high selectivity, and under hydrocarbon conversion conditions can provide a high percentage of desired products relative to total products.

SSZ-50 zeolites can be used in processing hydrocarbonaceous feedstocks. Hydrocarbonaceous feedstocks contain carbon compounds and can be from many different sources, such as virgin petroleum fractions, recycle petroleum fractions, shale oil, liquefied coal, tar sand oil, synthetic paraffins from NAO, recycled plastic feedstocks and, in general, can be any carbon containing feedstock susceptible to zeolitic catalytic reactions. Depending on the type of processing the hydrocarbonaceous feed is to undergo, the feed can contain metal or be free of metals, it can also have high or low nitrogen or sulfur impurities. It can be appreciated, however, that in general processing will be more efficient (and the catalyst more active) the lower the metal, nitrogen, and sulfur content of the feedstock.

The conversion of hydrocarbonaceous feeds can take place in any convenient mode, for example, in fluidized bed, moving bed, or fixed bed reactors depending on the types of process desired. The formulation of the catalyst particles will vary depending on the conversion process and method of operation.

Other reactions which can be performed using the catalyst of this invention containing a metal, e.g., a Group VIII metal such platinum, include hydrogenation-dehydrogenation reactions, denitrogenation and desulfurization reactions.

The following table indicates typical reaction conditions which may be employed when using catalysts comprising SSZ-50 in the hydrocarbon conversion reactions of this invention. Preferred conditions are indicated in parentheses.

| Process | Temp., ° C. | Pressure | LHSV |
|---|---|---|---|
| Hydrocracking | 175–485 | 0.5–350 bar | 0.1–30 |
| Dewaxing | 200–475 | 15–3000 psig | 0.1–20 |
|  | (250–450) | (200–3000) | (0.2–10) |
| Cat. cracking | 127–885 | subatm.-[1] | 0.5–50 |
|  |  | (atm.–5 atm.) |  |
| Oligomerization | 232–649[2] | 0.1–50 atm.[2,3] | 0.2–50[2] |
|  | 10–232[4] | — | 0.05–20[5] |
|  | (27–204)[4] | — | (0.1–10)[5] |
| Condensation of alcohols | 260–538 | 0.5–1000 psig | 0.5–50[5] |
| Isomerization | 93–538 | 50–1000 psig | 1–10 |
|  | (204–315) |  | (1–4) |

[1]Several hundred atmospheres
[2]Gas phase reaction
[3]Hydrocarbon partial pressure
[4]Liquid phase reaction
[5]WHSV Other reaction conditions and parameters are provided below.

Hydrocracking

Using a catalyst which comprises SSZ-50, preferably predominantly in the hydrogen form, and a hydrogenation promoter, heavy petroleum residual feedstocks, cyclic stocks and other hydrocrackate charge stocks can be hydrocracked using the process conditions and catalyst components disclosed in the aforementioned U.S. Pat. No. 4,910,006 and U.S. Pat. No. 5,316,753.

The hydrocracking catalysts contain an effective amount of at least one hydrogenation component of the type commonly employed in hydrocracking catalysts. The hydrogenation component is generally selected from the group of hydrogenation catalysts consisting of one or more metals of Group VIB and Group VIII, including the salts, complexes and solutions containing such. The hydrogenation catalyst is preferably selected from the group of metals, salts and complexes thereof of the group consisting of at least one of platinum, palladium, rhodium, iridium, ruthenium and mixtures thereof or the group consisting of at least one of nickel, molybdenum, cobalt, tungsten, titanium, chromium and mixtures thereof Reference to the catalytically active metal or metals is intended to encompass such metal or metals in the elemental state or in some form such as an oxide, sulfide, halide, carboxylate and the like. The hydrogenation catalyst is present in an effective amount to provide the hydrogenation function of the hydrocracking catalyst, and preferably in the range of from 0.05 to 25% by weight.

Dewaxing

SSZ-50, preferably predominantly in the hydrogen form, can be used to dewax hydrocarbonaceous feeds by selectively removing straight chain paraffins. Typically, the viscosity index of the dewaxed product is improved (compared to the waxy feed) when the waxy feed is contacted with SSZ-50 under isomerization dewaxing conditions.

The catalytic dewaxing conditions are dependent in large measure on the feed used and upon the desired pour point. Hydrogen is preferably present in the reaction zone during the catalytic dewaxing process. The hydrogen to feed ratio is typically between about 500 and about 30,000 SCF/bbl (standard cubic feet per barrel), preferably about 1000 to about 20,000 SCF/bbl. Generally, hydrogen will be separated from the product and recycled to the reaction zone. Typical feedstocks include light gas oil, heavy gas oils and reduced crudes boiling above about 350° F.

A typical dewaxing process is the catalytic dewaxing of a hydrocarbon oil feedstock boiling above about 350° F. and containing straight chain and slightly branched chain hydrocarbons by contacting the hydrocarbon oil feedstock in the presence of added hydrogen gas at a hydrogen pressure of about 15–3000 psi with a catalyst comprising SSZ-50 and at least one Group VIII metal.

The SSZ-50 hydrodewaxing catalyst may optionally contain a hydrogenation component of the type commonly employed in dewaxing catalysts. See the aforementioned U.S. Pat. No. 4,910,006 and U.S. Pat. No. 5,316,753 for examples of these hydrogenation components.

The hydrogenation component is present in an effective amount to provide an effective hydrodewaxing and hydroisomerization catalyst preferably in the range of from about 0.05 to 5% by weight. The catalyst may be run in such a mode to increase isodewaxing at the expense of cracking reactions.

The feed may be hydrocracked, followed by dewaxing. This type of two stage process and typical hydrocracking conditions are described in U.S. Pat. No. 4,921,594, issued May 1, 1990 to Miller, which is incorporated herein by reference in its entirety.

SSZ-50 may also be utilized as a dewaxing catalyst in the form of a layered catalyst. That is, the catalyst comprises a first layer comprising zeolite SSZ-50 and at least one Group VIII metal, and a second layer comprising an aluminosilicate zeolite which has different shape selectivity than zeolite SSZ-50. The use of layered catalysts is disclosed in U.S. Pat. No. 5,149,421, issued Sep. 22, 1992 to Miller, which is incorporated by reference herein in its entirety. The layering may also include a bed of SSZ-50 layered with a non-zeolitic component designed for either hydrocracking or hydrofinishing.

SSZ-50 may also be used to dewax raffinates, including bright stock, under conditions such as those disclosed in U.S. Pat. No. 4,181,598, issued Jan. 1, 1980 to Gillespie et al., which is incorporated by reference herein in its entirety.

It is often desirable to use mild hydrogenation (sometimes referred to as hydrofinishing) to produce more stable dewaxed products. The hydrofinishing step can be performed either before or after the dewaxing step, and preferably after. Hydrofinishing is typically conducted at temperatures ranging from about 190° C. to about 340° C. at pressures from about 400 psig to about 3000 psig at space velocities (LHSV) between about 0.1 and 20 and a hydrogen recycle rate of about 400 to 1500 SCF/bbl. The hydrogenation catalyst employed must be active enough not only to hydrogenate the olefins, diolefins and color bodies which may be present, but also to reduce the aromatic content. Suitable hydrogenation catalyst are disclosed in U.S. Pat. No. 4,921,594, issued May 1, 1990 to Miller, which is incorporated by reference herein in its entirety. The hydrofinishing step is beneficial in preparing an acceptably stable product (e.g., a lubricating oil) since dewaxed products prepared from hydrocracked stocks tend to be unstable to air and light and tend to form sludges spontaneously and quickly. Lube oil may be prepared using SSZ-50. For example, a $C_{20+}$ lube oil may be made by isomerizing a $C_{20+}$ olefin feed over a catalyst comprising SSZ-50 in the hydrogen form and at least one Group VIII metal. Alternatively, the lubricating oil may be made by hydrocracking in a hydrocracking zone a hydrocarbonaceous feedstock to obtain an effluent comprising a hydrocracked oil, and catalytically dewaxing the effluent at a temperature of at least about 400° F. and at a pressure of from about 15 psig to about 3000 psig in the presence of added hydrogen gas with a catalyst comprising SSZ-50 in the hydrogen form and at least one Group VIII metal.

Catalytic Cracking

Hydrocarbon cracking stocks can be catalytically cracked in the absence of hydrogen using SSZ-50, preferably predominantly in the hydrogen form.

When SSZ-50 is used as a catalytic cracking catalyst in the absence of hydrogen, the catalyst may be employed in conjunction with traditional cracking catalysts, e.g., any aluminosilicate heretofore employed as a component in cracking catalysts. Typically, these are large pore, crystalline aluminosilicates. Examples of these traditional cracking catalysts are disclosed in the aforementioned U.S. Pat. No. 4,910,006 and U.S. Pat. No 5,316,753. When a traditional cracking catalyst (TC) component is employed, the relative weight ratio of the TC to the SSZ-50 is generally between about 1:10 and about 500: 1, desirably between about 1:10 and about 200: 1, preferably between about 1:2 and about 50: 1, and most preferably is between about 1:1 and about 20:1. The novel zeolite and/or the traditional cracking component may be further ion exchanged with rare earth ions to modify selectivity.

The cracking catalysts are typically employed with an inorganic oxide matrix component. See the aforementioned U.S. Pat. No. 4,910,006 and U.S. Pat. No. 5,316,753 for examples of such matrix components.

Oligomerization

It is expected that SSZ-50 can also be used to oligomerize straight and branched chain olefins having from about 2 to 21 and preferably 2–5 carbon atoms. The oligomers which are the products of the process are medium to heavy olefins which are useful for both fuels, i.e., gasoline or a gasoline blending stock and chemicals.

The oligomerization process comprises contacting the olefin feedstock in the gaseous or liquid phase with a catalyst comprising SSZ-50.

The zeolite can have the original cations associated therewith replaced by a wide variety of other cations according to techniques well known in the art. Typical cations would include hydrogen, ammonium and metal cations including mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel. One of the prime requisites is that the zeolite have a fairly low aromatization activity, i.e., in which the amount of aromatics produced is not more than about 20% by weight. This is accomplished by using a zeolite with controlled acid activity [alpha value] of from about 0.1 to about 120, preferably from about 0.1 to about 100, as measured by its ability to crack n-hexane.

Alpha values are defined by a standard test known in the art, e.g., as shown in U.S. Pat. No. 3,960,978 issued on Jun. 1, 1976 to Givens et al. which is incorporated totally herein by reference. If required, such zeolites may be obtained by steaming, by use in a conversion process or by any other method which may occur to one skilled in this art.

Isomerization of Olefins

SSZ-50 can be used to isomerize olefins. The feed stream is a hydrocarbon stream containing at least one $C_{4-6}$ olefin, preferably a $C_{4-6}$ normal olefin, more preferably normal butene. Normal butene as used in this specification means all forms of normal butene, e.g., 1-butene, cis-2-butene, and trans-2-butene. Typically, hydrocarbons other than normal butene or other $C_{4-6}$ normal olefins will be present in the feed stream. These other hydrocarbons may include, e.g., alkanes, other olefins, aromatics, hydrogen, and inert gases.

The feed stream typically may be the effluent from a fluid catalytic cracking unit or a methyl-tert-butyl ether unit. A fluid catalytic cracking unit effluent typically contains about 40–60 weight percent normal butenes. A methyl-tert-butyl ether unit effluent typically contains 40–100 weight percent normal butene. The feed stream preferably contains at least about 40 weight percent normal butene, more preferably at least about 65 weight percent normal butene. The terms iso-olefin and methyl branched iso-olefin may be used interchangeably in this specification.

The process is carried out under isomerization conditions. The hydrocarbon feed is contacted in a vapor phase with a catalyst comprising the SSZ-50. The process may be carried out generally at a temperature from about 625° F. to about 950° F. (329–510° C.), for butenes, preferably from about 700° F. to about 900° F. (371–482° C.), and about 350° F. to about 650° F. (177–343° C.) for pentenes and hexenes. The pressure ranges from subatmospheric to about 200 psig, preferably from about 15 psig to about 200 psig, and more preferably from about 1 psig to about 150 psig.

The liquid hourly space velocity during contacting is generally from about 0.1 to about 50 $hr^{-1}$, based on the hydrocarbon feed, preferably from about 0.1 to about 20 $hr^{-1}$, more preferably from about 0.2 to about 10 $hr^{-1}$, most preferably from about 1 to about 5 $hr^{-1}$. A hydrogen/hydrocarbon molar ratio is maintained from about 0 to about 30 or higher. The hydrogen can be added directly to the feed stream or directly to the isomerization zone. The reaction is preferably substantially free of water, typically less than about two weight percent based on the feed. The process can be carried out in a packed bed reactor, a fixed bed, fluidized bed reactor, or a moving bed reactor. The bed of the catalyst can move upward or downward. The mole percent conversion of, e.g., normal butene to iso-butene is at least 10, preferably at least 25, and more preferably at least 35.

Methane Upgrading

Higher molecular weight hydrocarbons can be formed from lower molecular weight hydrocarbons by contacting the lower molecular weight hydrocarbon with a catalyst comprising SSZ-50 and a metal or metal compound capable of converting the lower molecular weight hydrocarbon to a higher molecular weight hydrocarbon. Examples of such reactions include the conversion of methane to $C_{2+}$ hydrocarbons such as ethylene or benzene or both. Examples of useful metals and metal compounds include lanthanide and or actinide metals or metal compounds.

These reactions, the metals or metal compounds employed and the conditions under which they can be run are disclosed in U.S. Pat. No. 4,734,537, issued Mar. 29, 1988 to Devries et al.; U.S. Pat. No. 4,939,311, issued Jul. 3, 1990 to Washecheck et al. U.S. Pat. No. 4,962,261, issued Oct. 9, 1990 to Abrevaya et al.; U.S. Pat. No. 5,095,161, issued Mar. 10, 1992 to Abrevaya et al.; U.S. Pat. No. 5,105,044, issued Apr. 14, 1992 to Han et al.; U.S. Pat. No. 5,105,046, issued Apr. 14, 1992 to Washecheck; U.S. Pat. No. 5,238,898, issued Aug. 24, 1993 to Han et al.; U.S. Pat. No. 5,321,185, issued Jun. 14, 1994 to van der Vaart; and U.S. Pat. No. 5,336,825, issued Aug. 9, 1994 to Choudhary et al., each of which is incorporated herein by reference in its entirety.

Condensation of Alcohols

SSZ-50 can be used to convert lower aliphatic.alcohols having 1 to 10 carbon atoms to olefins. The process disclosed in U.S. Pat. No. 3,894,107, issued Jul. 8, 1975 to Butter et al., describes the process conditions used in this process, which patent is incorporated totally herein by reference.

The catalyst may be in the hydrogen form or may be base exchanged or impregnated to contain ammonium or a metal cation complement, preferably in the range of from about 0.05 to 5% by weight. The metal cations that may be present include any of the metals of the Groups I through VIII of the Periodic Table. However, in the case of Group IA metals, the cation content should in no case be so large as to effectively inactivate the catalyst, nor should the exchange be such as to eliminate all acidity. There may be other processes involving treatment of oxygenated substrates where a basic catalyst is desired.

Other Uses for SSZ-50

SSZ-50 can also be used as an adsorbent with high selectivities based on molecular sieve behavior and also based upon preferential hydrocarbon packing within the pores.

SSZ-50 may also be used for the catalytic reduction of the oxides of nitrogen in a gas stream. Typically, the gas stream also contains oxygen, often a stoichiometric excess thereof. Also, the SSZ-50 may contain a metal or metal ions within or on it which are capable of catalyzing the reduction of the nitrogen oxides. Examples of such metals or metal ions include copper, cobalt and mixtures thereof.

One example of such a process for the catalytic reduction of oxides of nitrogen in the presence of a zeolite is disclosed in U.S. Pat. No. 4,297,328, issued Oct. 27, 1981 to Ritscher et al., which is incorporated by reference herein. There, the catalytic process is the combustion of carbon monoxide and hydrocarbons and the catalytic reduction of the oxides of nitrogen contained in a gas stream, such as the exhaust gas from an internal combustion engine. The zeolite used is metal ion-exchanged, doped or loaded sufficiently so as to provide an effective amount of catalytic copper metal or copper ions within or on the zeolite. In addition, the process is conducted in an excess of oxidant, e.g., oxygen.

SSZ-50 may also be used in the separation of gases, such as the separation of nitrogen from a nitrogen-containing gas mixture. One example of such separation is the separation of nitrogen from methane (e.g., the separation of nitrogen from natural gas).

EXAMPLES

The following examples demonstrate but do not limit the present invention.

Example 1

Synthesis of N-ethyl-N-methyl-5,7,7-trimethyl-2-azonium bicyclo[4.1.1]octane Cation (Template A)

20 Grams of verbenone (Aldrich) is hydrogenated in a Parr hydrogenator to reduce the olefin. 2 Grams of Pd on charcoal is used as catalyst in 200 cc ethanol (100%) and under 60 psig of hydrogen. After reaction, the mixture is passed through a short column of celite on silica, using ethanol for rinsing. Repeating this process yields additional quantities of the reduced bicyclo ketone. 72.9 Grams of this product is then combined with 40.34 grams of hydroxylamine hydrochloride, 78.6 grams of sodium acetate (trihydrate), 435 ml of ethanol (95%), and 218 grams of water. This mixture is refluxed for 2 hours. The cooled mixture is worked up by pouring into a brine solution and carrying out chloroform extractions (3×250 ml). The extracts are dried and stripped. Next, 88 grams of this oxime is reacted with several components to yield a Beckmann rearranged product. The oxime is refluxed for 6 hours (80° C.) in a mixture of 153 grams of tosyl chloride, 185 grams of potassium carbonate, 768 ml of dimethoxy ethane, and 666 ml of water. The dimethoxy ethane is removed in a roto-evaporator. The remaining aqueous phase is extracted with chloroform (3×250 ml), and the latter is washed once with 300 ml of brine solution and then dried over sodium sulfate. Removing the dried solvent yields 76 grams of oil, a mixture of lactam products.

The desired product can be isolated by column separation using 2 kg of silica, slurried in n-hexane. The oil is loaded onto the column using 50 ml of methylene chloride. The column is run using 2% methanol in chloroform. 57.55 Grams of product is collected from fractions with the same TLC.

For reduction of the lactam, the following equipment is set up: a 3-neck round bottom with a cooling condenser, an addition funnel and a gas bubbler. A dry ice/acetone cold bath was used to control temperature during the reduction step. Under an inert atmosphere, 41.2 grams of lithium aluminum hydride is added into 1030 ml anhydrous diethyl ether (cooled ). Using the addition finnel, 57.5 grams of lactam is added in 520 ml methylene chloride. The addition is intentionally slow to control heat evolution. Gradually, the reaction is allowed to come to room temperature. Following by TLC shows the reaction is complete after overnight stirring at room temperature. Carefully, 41 ml of water is added with good stirring, and considerable gas evolution is seen via the bubbler. Next, 41 grams of 15% NaOH is slowly added, and then finally 123.5 ml of water is added last and stirred for a while. The solids formed are collected by filtration and washed with additional methylene chloride. The combined organic washings are treated with an acidic aqueous solution to extract the protonated amines. Next, the aqueous solution is made basic and extracted with ether to collect the free amine.

12.80 Grams of the resulting amine is placed in an Erlenmeyer flask equipped with condenser. 80 Milliliters of methanol is used as solvent and 19.12 grams of ethyl iodide is the alkylating agent. The reaction mixture is refluxed for 48 hours. The salt product is forced out with ether addition. The oil is taken up in 100 ml water, pH is adjusted to 12 and the free amine is extracted into methylene chloride. After drying and stripping, 11.14 grams of mono ethylated amine is recovered as an oil. This material is reacted in 60 ml of methanol with 17.56 grams of methyl iodide to give the desired N, methyl, ethyl quaternized product, Template A. Recrystallization from a solvent system consisting of the mixture of acetone, ethyl acetate and ether gives a solid with a melting point in the 215–220 range. The C and H NMR are correct for the desired product. The template is converted from the iodide form to the hydroxide form using BioRad AG 1-X8 exchange resin.

Example 2

Synthesis of SSZ-50

3.13 Grams of a 0.48 M solution of Template A is placed into the Teflon cup of a Parr 23 ml reactor. 0.95 Grams of 1.0 N NaOH is added along with 1.07 grams of water. Solid $SiO_2$ is added as 0.533 grams of Cabosil, and aluminum is supplied as 0.17 grams of sodium Y zeolite. The mixture is heated at 160° C. with 43 RPM tumbling within a Blue M oven. The reaction. is stopped after 7 days. The cooled reaction product has a pH near 12.5. Electron micrographs show the presence of a new crystalline product. The solids are filtered, washed, dried, and determined by X-ray diffraction to be SSZ-50.

Example 3

Synthesis of SSZ-50

A reaction like Example 2 is set up except that the aluminum source is LZ 210, a partially dealuminated Y zeolite. 0.19 Grams of this component is mixed with 4.18 grams of the same template solution, 0.51 grams of the NaOH solution, 0.14 grams of water and 0.49 grams of Cabosil. Heating at 170° C. for 9 days produced the SSZ-50 product. The full XRD pattern is shown in Table II below.

TABLE II

| 2 Theta$^{(a)}$ | D | I/I$_o$ × 100 |
|---|---|---|
| 8.48 | 10.42 | 55 |
| 8.97 | 9.85 | 100 |
| 10.02 | 8.22 | 23 |
| 12.31 | 7.18 | 5 |
| 14.09 | 6.28 | 10 |
| 15.68 | 5.65 | 12 |
| 17.62 | 5.03 | 40 |
| 18.57 | 4.77 | 63 |
| 19.37 | 4.58 | 34 |
| 19.48 | 4.55 | 36 |
| 19.90 | 4.46 | 56 |
| 20.13sh | 4.41 | 32 |
| 21.26 | 4.18 | 2 |
| 22.90 | 3.88 | 17 |
| 23.25sh | 3.82 | 8 |
| 24.93 | 3.57 | 59 |
| 25.25sh | 3.52 | 36 |
| 25.85 | 3.44 | 7 |
| 27.18 | 3.28 | 7 |
| 27.93 | 3.19 | 10 |
| 28.13sh | 3.17 | 8 |
| 28.32sh | 3.15 | 7 |
| 28.54 | 3.13 | 8 |
| 29.93 | 2.98 | 7 |
| 30.36sh | 2.94 | 12 |
| 30.47 | 2.93 | 13 |
| 31.25sh | 2.86 | 5 |
| 31.50 | 2.84 | 7 |
| 32.38 | 2.76 | 12 |
| 33.05 | 2.71 | 3 |
| 33.56 | 2.67 | 4 |
| 35.21 | 2.55 | 4 |
| 35.69 | 2.51 | 2 |
| 37.01 | 2.43 | 5 |
| 37.71 | 2.39 | 3 |
| 39.15 | 2.30 | 3 |
| 41.09 | 2.20 | 3 |

Example 4

Synthesis of High-Silica SSZ-50

SSZ-50 can be synthesized from a mixture starting with a silica/alumina mole ratio of 100. 3.13 Grams of template, 1.0 gram of 1 N NaOH and 3.78 grams of water are combined. An aluminum source, 0.02 grams of Reheis F-2000 (53% Al2O3) is dissolved in the reaction mixture and 0.62 grams of Cabosil is added last. The reaction vessel is closed and heated at 170° C. with 43 RPM tumbling. After 16 days of heating the reaction has transformed from a gel to a settled set of solids below a clear solution. The typical work-up yields a product which is SSZ-50 by XRD analysis.

Example 5

Calcination of SSZ-50

The SSZ-50 made in Example 3 is calcined using a ramp program: 2 degrees C/min to 125° C., hold for 2 hours, then 2 degrees C/min to 540° C., hold for 4 hours. The recovered material is analyzed by XRD and shows that SSZ-50 retains crystallinity. The full XRD pattern is shown in Table III below.

TABLE III

| 2 Theta$^{(a)}$ | D | I/I$_o$ × 100 |
|---|---|---|
| 8.46 | 10.44 | 79 |
| 8.94 | 9.88 | 100 |
| 10.00 | 8.84 | 47 |
| 12.37 | 7.15 | 4 |
| 12.73 | 6.95 | 3 |
| 14.11 | 6.27 | 2 |
| 15.68 | 5.65 | 3 |
| 17.03 | 5.20 | 1 |
| 17.59 | 5.04 | 9 |
| 18.62 | 4.76 | 27 |
| 19.36 | 4.58 | 11 |
| 19.75 | 4.49 | 12 |
| 19.93 | 4.45 | 16 |
| 20.14 | 4.41 | 10 |
| 21.27 | 4.17 | 2 |
| 23.00 | 3.86 | 10 |
| 24.93 | 3.57 | 11 |
| 25.40sh | 3.50 | 6 |
| 25.75sh | 3.46 | 4 |
| 27.26 | 3.27 | 2 |
| 27.94 | 3.19 | 4 |
| 28.50 | 3.13 | 2 |
| 29.83 | 2.99 | 3 |
| 30.48 | 2.93 | 7 |
| 31.25 | 2.86 | 1 |
| 31.58 | 2.83 | 3 |
| 32.36 | 2.76 | 5 |
| 33.72 | 2.66 | 2 |
| 34.73sh | 2.58 | 1 |
| 35.23 | 2.55 | 2 |
| 37.03 | 2.43 | 2 |
| 37.77 | 2.38 | 1 |

Example 6

N$_2$ Micropore Volume of SSZ-50

Calcined SSZ-50, after drying to 350° C., in situ, is measured for nitrogen gas uptake. The void volume capacity is found to be 0.22 cc/gm with a surface area measured to 500 m$^2$/gm. This demonstrates that SSZ-50 is highly microporous

Example 7

Use of SSZ-50 to Convert Methanol

The calcined material from Example 5 is given one NH4NO3 exchange at 90° C. for 2 hours and then pelleted and meshed to 20–40. The chips, 0.37 grams, are loaded into a downflow reactor. The chips are supported by packed glass wool in the reactor. Using a Harvard syringe pump, methanol is delivered to the catalyst bed, once it has been dried at about 430° C. The reaction of methanol is carried out under atmospheric conditions using 200 cc/min N2 sweep. The actual reaction was carried out at 400° C., using a feed of 22.1 % methanol in water.

The products from the reaction are shown below. There is no methanol breakthrough for almost the first 5 hours which is very surprising for a small pore zeolite like SSZ-50. The catalyst makes light products of chiefly C$_4$ and lower. Impressive is the fact that the products are greater than 95% olefinic.

|  | Run time (min.) | | | | | | | |
| --- | --- | --- | --- | --- | --- | --- | --- | --- |
|  | 10 | 80 | 150 | 220 | 290 | 360 | 430 | 465 |
| Methane | 0.68 | 0.47 | 0.45 | 0.58 | 0.66 | 0.5 | 0.53 | 0.62 |
| Ethylene | 17.79 | 22.55 | 17.3 | 19.69 | 23.62 | 20.51 | 19.44 | 19.49 |
| Propylene/$C_4$ | 51.87 | 51.33 | 49.68 | 48.93 | 47.29 | 44.98 | 39.24 | 38.54 |
| Dimethylether |  |  |  |  | 0.47 | 1.48 | 2.12 | 2.46 |
| Isobutane | 2.54 |  |  |  |  |  |  |  |
| Methanol |  |  |  |  | 1.16 | 4.77 | 14.97 | 15.5 |
| $C_4$ | 8.17 | 1.07 | 0.85 | 0.64 |  |  |  |  |
| $C_4=$ | 12.39 | 19.49 | 24.17 | 26.48 | 21.29 | 21.37 | 18.61 | 18.31 |
| $C_5=$ | 6.51 | 5.09 | 7.55 | 6.68 | 5.51 | 6.51 | 5.07 | 5.08 |
| Olefin* | 88.56 | 98.46 | 98.7 | 98.78 | 97.71 | 93.37 | 82.36 | 81.42 |
| Paraffin | 11.39 | 1.54 | 1.3 | 1.22 | 0.66 | 0.5 | 0.53 | 0.62 |
| Olefin/Paraffin | 7.78 | 63.94 | 75.92 | 80.97 | 148.05 | 186.74 | 155.4 | 1312.32 |

*Assumes all $C_3$ are propylene

Example 8

Synthesis of All-Silica SSZ-50

Five millimoles of Template A in 9 grams of solution is mixed with 2.10 grams of tetraethyl orthosilicate in a Teflon cup and the resulting mixture is allowed to hydrolyyse the silica and let ethanol evaporate at room temperature until the net mass in the Teflon cup is 4.00 grams. This requires several days. Then 0.205 gram of 50% HF is added carefully and dropwise to the Teflon cup. The resulting mixture is stirred with a plastic spatula until a thick gel forms. The reactor is closed, loaded onto a spit (43 rpm) and heated to 150° C. while tumbling. The reactor is checked periodically for signs of liquid separation (an indication of the gel transformation into crystals). After 29 days of reaction, the solids that have formed are collected, filtered and washed. X-ray powder diffraction shows the product to be SSZ-50.

Comparative Example A

Synthesis of Borosilicate Having RTH Structure SSZ-50 is structurally related to zeolite RUB-13, a borosilicate. Template A can also crystallize this product. 4.18 Grams of Template A is mixed in the Teflon cup of a Parr reactor with 0.80 grams of 1 N NaOH, 3.0 grams of water and 0.038 grams of sodium borate decahydrate. When the borate salt had dissolved, 0.62 grams of Cabosil is blended in and reaction is commenced with 160° C. heating and 43 RPM tumbling. The crystallization is complete by 16 days of run time. The product had the RUB-13 XRD pattern.

The RUB-13 product is calcined as in Example 6, except the atmosphere is largely nitrogen with only a minor "bleed" of air being admitted into the sweep gas. The calcined RUB-13 also is found to have a large micropore volume, 0.22 cc/gm.

Comparative Example B

Aluminum Treatment of Borosilicate RUB-13

An attempt was made to replace the boron in the borosilicate RUB-13 of Comparative Example A with aluminum. 0.62 Grams of calcined RUB-13 from Comparative example A is heated overnight to 86° C. in 16 ml water containing 6 grams of aluminum nitrate nonahydrate. The treated product is filtered, washed with 100 ml of 0.01 N HCl and then water. The product is dried and prepared for catalyst evaluation as described in Example 7.

Comparative Example C

Methanol Conversion

Conversion of methanol is attempted as described above in Example 7 using the RUB-13 product from Comparative Example B. No conversion of the methanol is observed. This indicates that one could not get an active methanol conversion catalyst of the RTH structure starting with RUB-13. The recovered RUB-13 is white (no coke formation) and is subsequently analyzed for micropore volume to ensure that no pore plugging has occurred during the aluminum treatment. The inactive catalyst measured a micropore volume of 0.22 cc/gm, the value expected for a completely open RTH zeolite.

What is claimed is:

1. A zeolite having a mole ratio of about 20 or greater of an oxide selected from the group consisting of silicon oxide, germanium oxide and mixtures thereof to an oxide selected from aluminum oxide, gallium oxide, iron oxide, titanium oxide, indium oxide, vanadium oxide and mixtures thereof, and having, after calcination, the X-ray diffraction lines of Table I.

2. A zeolite according to claim 1 wherein the oxides comprise silicon oxide and aluminum oxide.

3. A zeolite according to claim 1 wherein said zeolite is predominantly in the hydrogen form.

4. A zeolite according to claim 1 wherein said zeolite is substantially free of acidity.

5. A zeolite according to claim 1 wherein the oxide comprises silicon oxide.

6. A zeolite having a composition, as synthesized and in the anhydrous state, in terms of mole ratios as follows:

$YO_2/W_cO_d$ 20 or greater $M_{2/n}/YO_2$ 0.03–0.20

$Q/YO_2$ 0.02–0.08 wherein Y is silicon, germanium or a mixture thereof, W is aluminum, gallium, iron, titanium, indium, vanadium or mixtures thereof, c is 1 or 2; d is 2 when c is 1 or d is 3 or 5 when c is 2; M is an alkali metal cation, alkaline earth metal cation or mixtures thereof; n is the valence of M; and Q is a quaternary ammonium cation having the structure

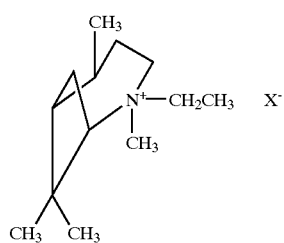

where X- is an anion which is not detrimental to the formation of the zeolite.

7. A zeolite according to claim 6 wherein W is aluminum and Y is silicon.

8. A zeolite according to claim 6 wherein Y is silicon and no $W_cO_d$ is present.

9. A method of preparing a crystalline material having the RTH crystal structure and having a mole ratio of about 20 or greater of an oxide selected from silicon oxide, germanium oxide and mixtures thereof to an oxide selected from aluminum oxide, gallium oxide, iron oxide, titanium oxide, indium oxide, vanadium oxide and mixtures thereof, said method comprising contacting under crystallization conditions sources of said oxides and a templating agent comprising a quaternary ammonium cation having the structure

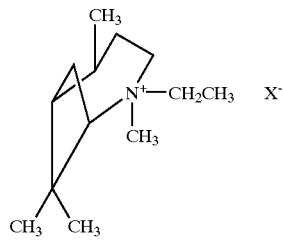

where X- is an anion which is not detrimental to the formation of the crystalline material.

10. The method according to claim 9 wherein the oxides are silicon oxide and aluminum oxide.

11. The method of claim 7 wherein the crystalline material has, after calcination, the X-ray diffraction lines of Table I.

12. The method according to claim 9 wherein the oxide is silicon oxide.

* * * * *